United States Patent [19]

Cary et al.

[11] 4,186,477
[45] Feb. 5, 1980

[54] CASH REGISTER BAG SEALING SYSTEM AND METHOD

[76] Inventors: Susan E. Cary, Rte. 2, Box 112, Morgan Rd., Hollywood, Md. 20636; Jesse C. Bunch, 815 Thayer Ave., #1630, Silver Spring, Md. 20910

[21] Appl. No.: 905,194

[22] Filed: May 12, 1978

[51] Int. Cl.² ............................................. B23P 11/00
[52] U.S. Cl. ................................... 29/432; 29/469.5; 29/716; 53/138 R; 156/92; 235/7 R
[58] Field of Search .................. 29/432, 432.1, 469.5; 53/390, 469, 138 R; 156/92; 235/7 R, 60

[56] References Cited

U.S. PATENT DOCUMENTS

| | | | |
|---|---|---|---|
| 2,063,345 | 12/1936 | Scott | 156/92 |
| 2,224,841 | 12/1940 | Berry | 29/432 X |
| 3,006,538 | 10/1961 | Deutsch | 235/7 R X |
| 3,289,929 | 12/1966 | Hecker et al. | 235/7 R |
| 3,472,447 | 10/1969 | Rethmeier | 235/60 |
| 3,662,514 | 5/1972 | Goss | 53/469 |
| 3,696,586 | 10/1972 | Sparks | 53/390 |
| 3,715,862 | 2/1973 | Schohl | 53/535 X |
| 3,807,129 | 4/1974 | Freidel et al. | 53/385 X |
| 3,860,091 | 1/1975 | Chesnut | 53/390 X |

*Primary Examiner*—Charlie T. Moon
*Attorney, Agent, or Firm*—Morton J. Rosenberg

[57] ABSTRACT

A cash register system which includes a standard cash register for totaling a plurality of transactions. During the totaling operation, a receipt is ejected from the cash register. A sealing mechanism is secured to a portion of the cash register for sealing a bag within which goods have been stored. Th open bag is inserted within the sealing mechanism and through a solenoid actuating switch, the sealing mechanism operation is initiated. Simultaneous with the sealing operation, a mechanism for securing the receipt to the bag is provided. Finally, a severing member secured to a portion of the sealing means severs the receipt from a receipt roll contained within the cash register. This results in a substantially sealed bag formed in closed contour having a receipt secured to an outer sidewall thereof.

23 Claims, 6 Drawing Figures

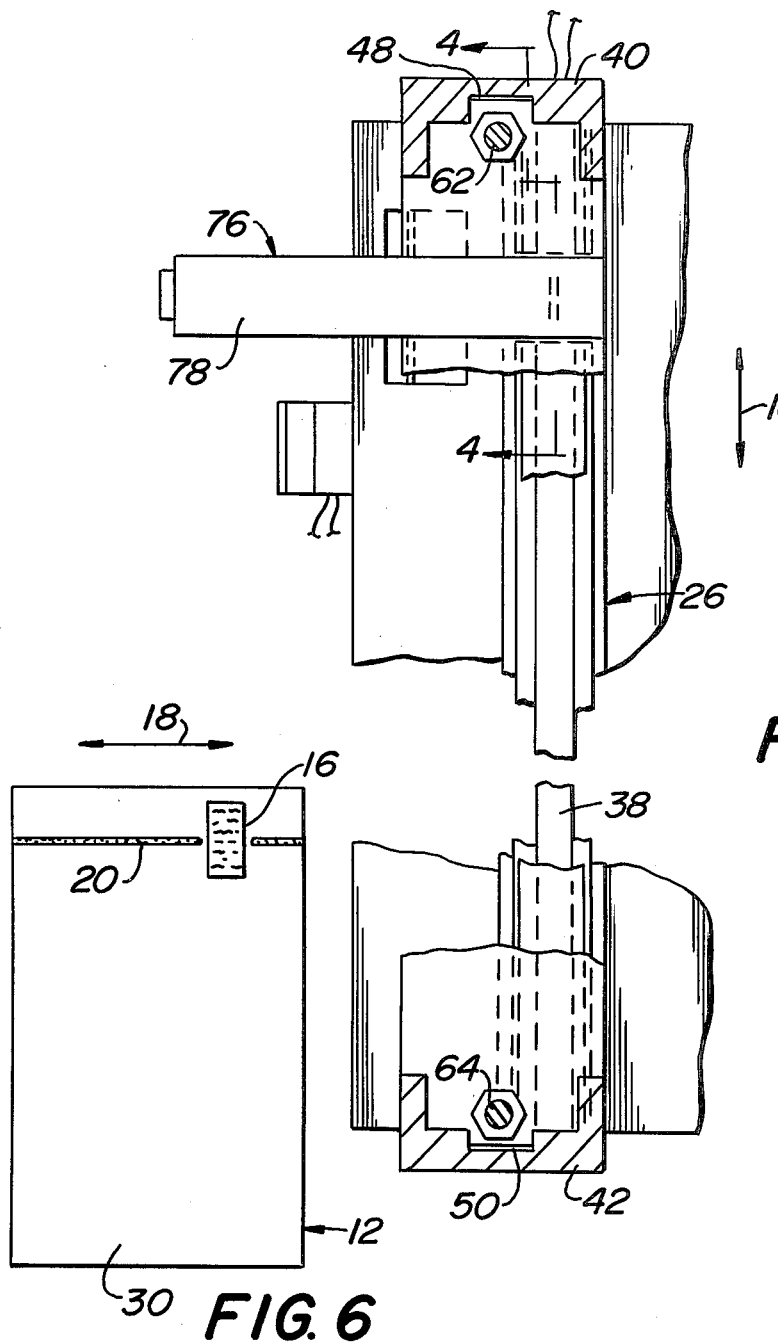

CASH REGISTER BAG SEALING SYSTEM AND METHOD

BACKGROUND OF THE INVENTION

1. Field of the Invention

This invention relates to cash register systems. In particular, this invention pertains to cash register systems wherein a bag filled with goods may be sealed at the conclusion of the totalization of transactions on the cash register. More in particular, this invention pertains to a cash register system that automatically seals the bag containing goods while at the same time, securing a receipt to an outer wall of the bag. Still further, this invention relates to a cash register system where the receipt ejected from within the cash register is severed from a receipt roll contained within the register. More in particular, this invention relates to a theft prevention system wherein contents within a bag are sealed and the bag may not be opened easily for insert of other goods.

2. Prior Art

Cash registers are well-known in the art. However, prior cash register systems did not provide for a means whereby a bag may be sealed and a receipt secured to an outer wall thereof. The closest reference found by the applicants, is U.S. Pat. No. 3,662,514. This prior system provided for a packaging system which is utilized in a check-out counter. In this reference, goods are totaled on a cash register and then placed on a shuttle or conveyor. The goods are then conveyed to a packaging stage and then inserted into a tubular net for sealing purposes. However, in this prior reference, the sealing stage is remote from the cash register which causes undue problems in actuation and usage. Additionally, this reference does not allow for automatic applying of a receipt tag to the packaged goods.

Other types of closing of bag devices are known in the art, such as those shown in U.S. Pat. Nos. 3,175,338; 2,358,125; 3,937,645; 3,079,067; 2,916,863; 3,522,425; and 3,792,565 all provide various types of wrapping and bag closing apparatus, however, none of them are directed to the overall concept of providing utilization of such bag closures in combination with a cash register check-out system having receipt fastening mechanisms.

Other systems such as those taught in U.S. Pat. No. 3,860,091 are directed to counter check-out systems, which may both tally the goods and automatically bag such. However, such does not provide for the closure of the bags in combination with the attachment of a receipt thereto. Still other references, such as U.S. Pat. Nos. 3,807,129; 3,715,862; and 3,740,922 are directed to systems where a check-out counter is provided in combination with automatic bagging of goods. However, these references do not provide for the total combination of securement of the bag and the receipt for the purposes provided as detailed in this invention concept.

SUMMARY OF THE INVENTION

A cash register system including a cash register for totaling a plurality of transactions and providing a receipt therefor. The receipt is expelled from the cash register. The improvement of the cash register system includes a sealing mechanism for sealing a bag in sealable relation subsequent to the totaling of the plurality of transactions. The sealing mechanism is secured to the cash register. Additionally, a securing mechanism is provided for securing the receipt to the bag substantially simultaneous with the bag sealing operation. The securing mechanism is fastened in secured relation to the sealing mechanism.

BRIEF DESCRIPTION OF THE DRAWINGS

FIG. 3 is a sectional view partially cut away of the cash register system taken along the section line 3—3 of FIG. 2;

DESCRIPTION OF THE PREFERRED EMBODIMENTS

Figure 1:
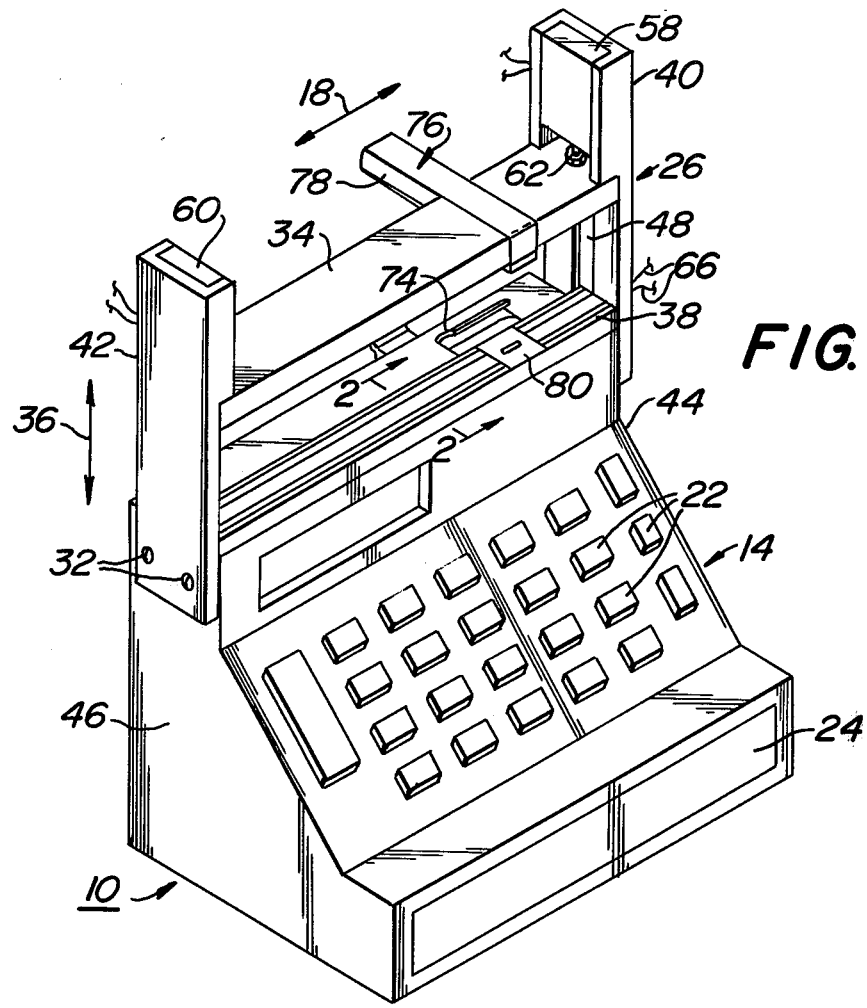
FIG. 1 is a perspective view of the cash register system.

Referring now to FIGS. 1 and 6, there is shown cash register system 10 for automatically sealing bag 12 in a closed contour formation while simultaneously attaching receipt 16 thereto. As can be seen in FIG. 6, at the conclusion of the actuation of cash register system 10, bag 12 containing goods is sealed across a top edge thereof in substantially transverse direction 18. Seal line 20 extends in transverse direction across bag 12 throughout at least a substantial portion of the transverse direction length of bag 12. Additionally, and in generally the same operational sequence as will be described in following paragraphs, receipt 16 is secured to the outer sidewall layers of bag 12.

Use of cash register system 10 and the associated method of sealing bag 12 is generally envisaged as a concluding sequence step after totaling has been accomplished through utilization of cash register 14. In this manner, a customer leaving a check-out station will have a closed contour bag 12 with receipt 16 attached thereto and visible by an external party. Utilization of cash register system 10 provides the customer with an easy to handle package and the assurance that receipt 16 will not be misplaced. Additionally, cash register system 10 provides means by which the customer having left a check-out center would find difficulty in opening bag 12 to possibly insert additional articles therein. Still further, with the securement of receipt 16, it becomes visibly evident that the customer has paid for the goods within bag 12, thus negating any need for employees of a store to check whether the goods contained within bag 12 have been paid for.

Cash register system 10 includes standard cash register 14 having a standard number of transaction keys 22 for totaling a plurality of transactions. Such cash registers 14 are well-known in the art and are commercially purchasable. In operation, a store employee totals up a plurality of transactions utilizing keys 22. At the conclusion, drawer 24 is automatically opened in the normal manner and the customer pays the monies due. An open bag 12 is filled with the goods and the employee actuates cash register system 10 in a manner to be described in following paragraphs for completing the transaction by sealing bag 12 along seal line 20 while substantially simultaneously attaching receipt 16 to the sidewalls.

Referring now to FIGS. 1-5, there is shown sealing mechanism 26 for sealing bag 12 in substantially a closed contour in sealable relation subsequent to the totaling of a plurality of transactions on cash register 14. As can be seen, sealing mechanism 26 is secured to cash register 14 through bolts, screws, or some other fixed securement mechanism 32. Such securement mechanism is not important to the inventive concept as is herein described, with the exception that sealing mechanism 26 should be mounted in a substantially fixed positional placement with respect to cash register 14. Through use of sealing mechanism 26, first bag sidewall 28 and second bag sidewall 30 are sealed or otherwise secured each to the other at the conclusion of the transaction totaling phase of cash register 14.

Sealing mechanism 26 includes first heat sealing bar member 34 which is reciprocally displaceable in vertical direction 36. Second heat sealing bar member 38 is secured in fixed relation to cash register 14 and is not displaceable with respect thereto. First heat sealing bar member 34 is displaceable into interfacing relation with respect to second sealing bar member 38 subsequent to bag 12 being inserted therebetween and having first heat sealing bar member 34 actuated in a downward direction.

Sealing mechanism 26 includes guideway elements secured to cash register 14 for maintaining first heat sealing bar member 34 in substantially a constrained sliding displacement in vertical direction 36. The guideway members include vertically directed first and second arm members 40 and 42 which are secured to opposing transverse sidewalls 44 and 46 of cash register 14 through bolts or screws 32. As can be seen in FIGS. 1 and 3, each of first and second arm members 40 and 42 include vertically directed trough sections 48 and 50 formed therein for mating interface with opposing ends of first heat sealing bar member 34. In this manner, first heat sealing bar member 34 is provided with a guideway within which such may be engageable in a reciprocal vertical direction 36 while maintaining a constrained relation to the remaining portions of cash register system 10.

Figure 5:
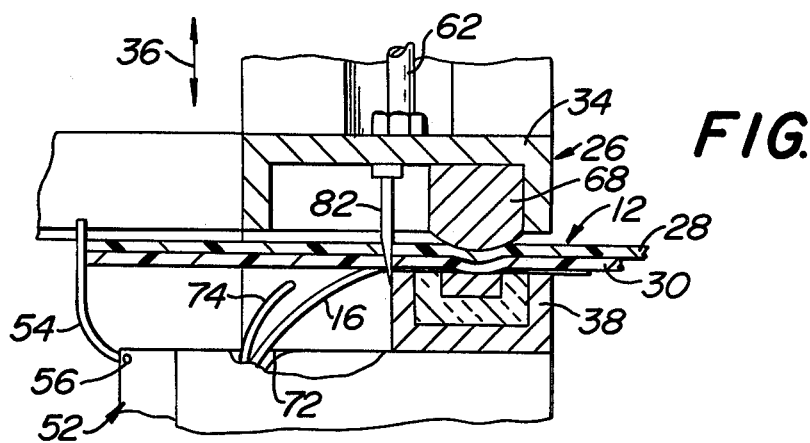
FIG. 5 is an expanded view in enlarged fashion of a portion of the cash register system as shown in FIG. 2; and, FIG. 6 is a frontal view of a bag which has been sealed by the cash register system.
Figure 2:
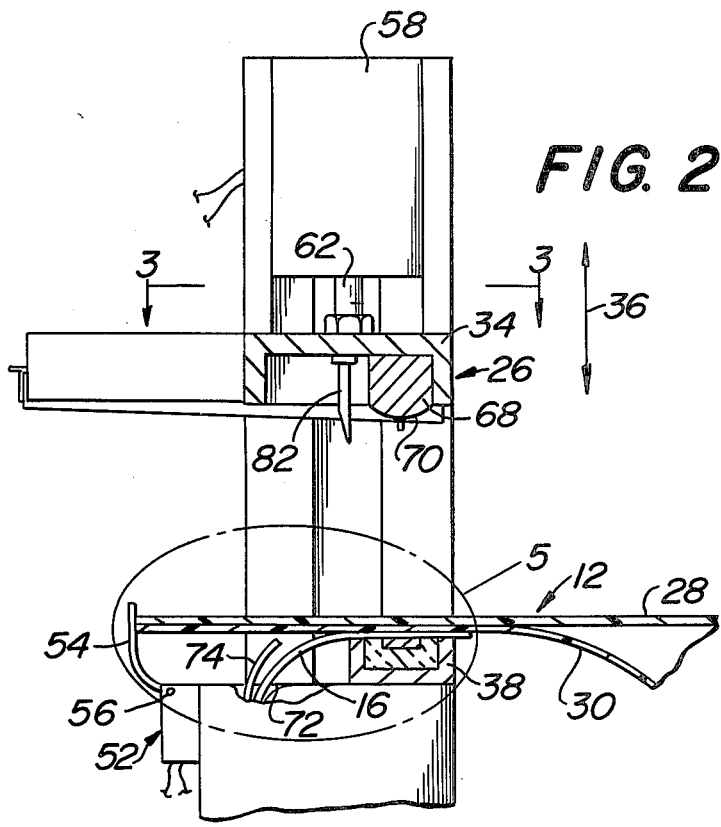
FIG. 2 is a sectional view of a portion of the cash register system taken along the section line 2—2 of FIG. 1.
Figure 4:
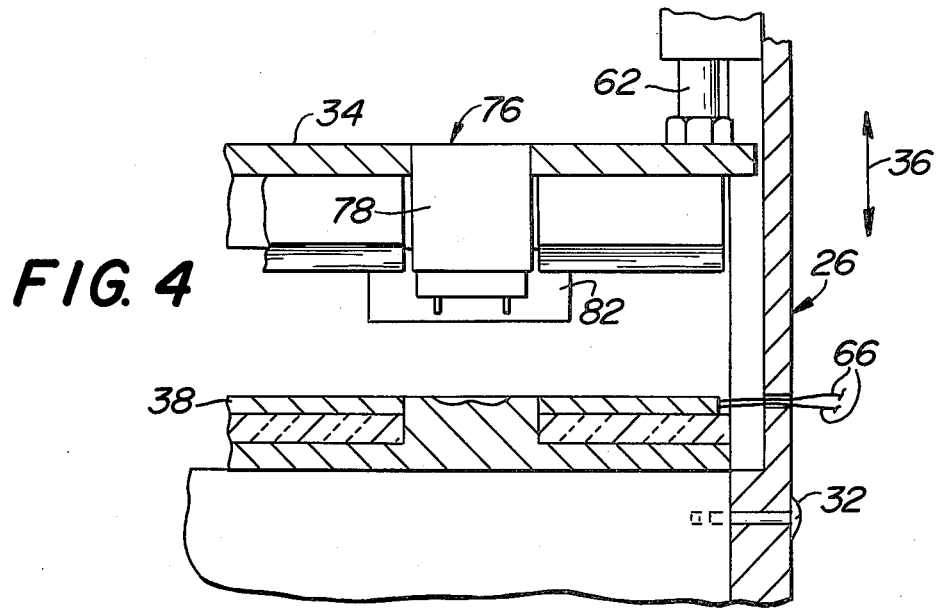
FIG. 4 is a sectional view of a portion of the cash cash register system taken along the section line 4—4 of FIG. 3.

Cash register system 10 and associated sealing mechanism 26 includes a mechanism for actuating first heat sealing bar member 34 in vertical direction 36. The actuating elements to be discussed in following paragraphs displaces first heat sealing bar member 34 responsive to a predetermined positional placement of bag 12. In order to actuate first heat sealing bar member 34, there is provided solenoid switch mechanism 52 mounted on a rear surface of cash register 14 as is clearly seen in FIGS. 1 and 2. Solenoid switch 52 is of a commercial type well-known in the art, and is coupled to a standard electrical output, as well as to other elements of the actuating members to be described in following sentences. Solenoid switch 52 includes rear mounted trigger lug member 54 which is pivoted to switch 52 about pivot actuating line 56. Insert of bag 12 sidewalls 28 and 30 between first and second heat sealing members 34 and 38 is shown in FIGS. 2 and 5. The operator displaces bag 12 until it is in contact with trigger lug member 54. A slight displacement or movement of trigger lug member 54 about pivot 56 actuates solenoid switch member 52 to provide electrical input for solenoid valves 58 and 60. Solenoid drive valves 58 and 60 displace or drive first heat sealing bar member 34 into interfacing relation with second heat sealing bar member 38 in a downward vertical manner 36. Solenoid valves 58 and 60 are standard commercially available valve mechanisms which include solenoid drive shafts 62 and 64 which are releasably coupled to respective solenoid valves 58 and 60 and fixedly secured to an upper surface of first heat sealing bar member 34. As is common in such standard systems, solenoid drive shafts 62 and 64 may be spring-biased in an upward direction in order that upon actuation of solenoid valves 58 and 60, shafts 62 and 64 are driven to provide interfacing relation between bar members 34 and 38. However, upon interfacing relation being accomplished, shafts 62 and 64 are then driven in an upward direction to provide a displaced vertical area between sealing bar members 34 and 38.

Thus, in operation, it is seen that initially bag 12 having sidewalls 28 and 30 is inserted between first and second heat sealing bar members 34 and 38 to a position adjacent and contiguous with trigger lug member 54. A slight movement or displacement of bag 12 in a rearward direction causes a slight displacement of trigger lug member 54 which causes actuation of solenoid switch 52. Actuation of solenoid switch 52 passes a current to solenoid valves 58 and 60. Passage of current thereto provides for actuation of solenoid drive shafts 62 and 64 in a vertical downward direction 36 until first heat sealing bar member is placed in interfacing relation with second heat sealing bar member.

Second heat sealing bar member 38 is formed of an electrical material and includes second heat sealing bar member leads 66 electrically coupled to a standard outlet current supply. Current is passed through second heat sealing bar member 38 to provide a heated surface and upon contact of first heat sealing bar member lug 68, there is a fusing of sidewalls 28 and 30 of bag 12 as is clearly seen in FIG. 5. This type of actuation and fusing of plastic bag elements is well-known in the art. Additionally, as is seen in FIG. 6, there is provided a substantially linear seal line passing across bag 12 in transverse direction 18.

First heat sealing bar member lug 68 includes a lower surface 70 which is generally arcuate in contour for ease in mating interface with second heat sealing bar member 38.

Cash register system 10 includes a securing mechanism for constraining receipt 16 to heat sealable bag 12 substantially simultaneous with the sealing of bag 12. The securing mechanism is fastened to sealing mechanism 26 in order that all operational sequence steps are provided in a substantially simultaneous manner.

As is seen in FIGS. 2 and 5, receipt 16 is ejected from internal cash register 14 through receipt opening 72 formed in an upper surface of cash register 14. Receipt 16 is guided in the upward direction by arcuate guide member 74 which causes receipt 16 to be positionally located as is shown in FIGS. 2 and 5. Receipt guide member 74 does not pass above the height of second heat sealing bar member 38 in order that bag 12 may be placed across an upper surface of bar member 38 in contiguous contact with receipt 16. The securing mechanism includes stapling mechanism 76 which is mounted and secured to first heat sealing bar member 34 and is provided with an internal chamber of standard size for accepting staples to be fastened through bag 12. It is seen that stapling mechanism 76 is positionally located in a predetermined relation to transverse direction 18 in order that receipt 16 may be captured by stapling mechanism 76. Stapling mechanism 76 includes staple gun 78 which is mounted to first heat sealing bar member 34 and is utilized for ejecting staples therefrom. Additionally, stapling mechanism includes base member 80 which is secured to second heat sealing bar member 38 in aligned relation to ejected staples from staple gun 78 for securing the staples to receipt 16 and bag 12. As first heat sealing bar member 34 is moved in a downward direction, to finally interface with second heat sealing bar member 38, staple gun 78 is actuated to eject staples through sidewalls 28, 30 and finally receipt 16. Staple base member 80 includes an arcuate portion formed therein to allow bending of the staples in the normal mode of operation.

As can be seen in FIGS. 2 and 5, first heat sealing bar member 34 includes knife element 82 for cutting receipt 16 when first heat sealing bar member 34 interfaces with second heat sealing bar member 38. Knife element 82 is fixedly mounted to an internal surface of first heat sealing bar member 34 and is movably displaced in a downward direction 36 responsive to the displacement of first heat sealing bar member 34. Upon interface, knife element 82 cuts through sidewalls 28 and 30 of bag 12 and further passes through receipt 16. In this manner, receipt 16 is severed from the remaining portions of the receipt roll which is contained within cash register 14.

Upon heat sealing, stapling, and cutting of the receipt 16, first heat sealing bar 34 is movably displaced in an upward direction and bag 12 is removed from cash register system 10. In this manner, there is provided a substantially closed contour bag 12 having a seal line 20 passing substantially throughout a transverse direction length 18 of bag 12. Simultaneously, it is seen from FIG. 6 that receipt 16 is stapled to external wall or sidewall 30 of bag 12 for simple identification by an external viewer.

Cash register system 10 provides a method of automatically sealing a heat sealable bag 12 on standard cash register 14 while simultaneously coupling bag 12 to receipt 16 ejected from cash register 14.

This method is initially provided by the operator first totaling transactions of a customer or other user, which causes ejection of receipt 16 from internal cash register 14. Subsequent to this totaling of transactions, the operator inserts bag 12 within heat sealing mechanism 26 between first heat sealing bar member 34 and second heat sealing bar member 38 which is mounted on cash register 14. By insertion of bag 12 between first heat sealing bar member 34 and second heat sealing bar member 38, the operator locates bag 12 adjacent receipt 16 and generally in a contiguous manner as is shown in FIGS. 2 and 5.

The operator then displaces bag 12 to contact solenoid switch lug member 54 which actuates heat sealing mechanism 26 responsive to the rearward positional placement of bag 12. Solenoid switch 52 is coupled to solenoid valves 58 and 60 and actuates both of valves 58 and 60 to drive first heat sealing bar member 34 into interfacing relation with second heat sealing bar member 38 for the capturing of bag 12 and receipt 16 therebetween.

Current is passed through second heat sealing bar member 38 to provide an increased temperature therein and bag sidewalls 28 and 30 are thermally fused to each other. In this manner, a portion of bag 12 is heat sealed.

Simultaneously to the heat sealing step, receipt 16 is secured to bag 12 by stapling receipt 16 to bag 12 through utilization of staple gun 78 in contact with base member 80 of stapling mechanism 76.

Subsequent to stapling, or concurrent therewith, knife member 82 which is mounted to first heat sealing bar member 34 passes through a portion of sidewalls 28 and 30 and further through receipt 16 for cutting of receipt 16 from the receipt roll contained within cash register 14.

In this manner, there has been provided an automatic method of substantially providing the user with a closed contour bag having a receipt 16 attached in secured manner to an external sidewall 30 thereof.

Heat sealing mechanism 26 may be one of a number of standard heat sealers well known in the art. In particular, mechanism 26 may be similar to heat sealers as shown and described in U.S. Pat. Nos. 4,016,021 or 3,847,712. Solenoid drive valves 58 and 60 may be of the type shown and described in U.S. Pat. Nos. 3,838,370 or 3,890,587.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

We claim:

1. A cash register system including a cash register for totaling a plurality of transactions and providing a receipt therefor, said receipt being expelled from said cash register, wherein the improvement comprises:
    (a) means for sealing a bag in sealable relation subsequent to said totaling of said plurality of said transactions, said sealing means being coupled to said cash register; and,
    (b) means for securing said receipt to said bag substantially simultaneous with said bag sealing, said securing means being secured to said sealing means.

2. The cash register system as recited in claim 1 where said sealing means includes heat sealing means for fusing a portion of a first sidewall of said bag to a second sidewall of said bag.

3. The cash register system as recited in claim 1 where said sealing means includes:
    (a) a first heat sealing bar member being vertically displaceable; and,
    (b) a second heat sealing bar member being secured to said cash register, said first heat sealing bar member being displaceble into interfacing relation with said second heat sealing bar member subsequent to said bag being inserted therebetween.

4. The cash register system as recited in claim 3 where said sealing means includes first heat sealing bar member actuating means for displacing said first heat sealing member responsive to a predetermined positional placement of said heat sealable bag.

5. The cash register system as recited in claim 4 where said first heat sealing bar member actuating means includes solenoid switch means secured to said cash register, said solenoid switch means being operable through impingement of said bag thereon.

6. The cash register system as recited in claim 5 where said actuating means includes solenoid drive means for driving said first heat sealing bar member into interfacing relation with said second heat sealing bar member.

7. The cash register system as recited in claim 3 where said securing means includes stapling means mounted to said first heat sealing bar member and said second heat sealing bar member.

8. The cash register system as recited in claim 7 where said stapling means is positionally located on said first and second heat sealing bar member in predetermined location for capturing said receipt.

9. The cash register system as recited in claim 8 where said stapling means includes:
(a) a staple gun mounted to said first heat sealing bar member for ejecting staples therefrom; and,
(b) a base member secured to said second heat sealing bar member in aligned relation to said ejected staples for securing said staples to said receipt and said bag.

10. The cash register system as recited in claim 3 where said sealing means includes guideway means secured to said cash register for maintaining said first heat sealing bar member in constrained sliding displacement in said vertical direction.

11. The cash register system as recited in claim 10 where said guideway means includes a pair of vertically directed arm members secured to opposing sidewalls of said cash register, each of said arm members including a vertically directed trough formed therein for mating interface with opposing ends of said first heat sealing bar member.

12. The cash register system as recited in claim 3 including cutting means secured to said first heat sealing bar member for cutting said receipt when said first heat sealing bar member interfaces with said second heat sealing bar member.

13. The cash register system as recited in claim 12 where said cutting means includes a knife element secured to said first heat sealing bar member for severing a portion of said bag and said receipt responsive to said displacement of said first heat sealing bar member.

14. The cash register system as recited in claim 3 where said heat sealable bag is formed of a plastic material.

15. A method of sealing a sealable bag coupled to a cash register and coupling said bag to a receipt ejected from said cash register, including the steps of:
(a) inserting said bag within a sealing mechanism coupled to said cash register;
(b) locating said bag adjacent said receipt;
(c) simultaneously sealing said bag and securing said receipt to said bag.

16. The method of sealing a bag as recited in claim 15 where the step of sealing said bag includes the step of heat sealing said bag.

17. The method of sealing a bag as recited in claim 16 where said step of heat sealing includes the step actuating said heat sealing mechanism responsive to positional placement of said bag.

18. The method of sealing a bag as recited in claim 17 where the step of actuating includes the step of contacting a solenoid switch with said bag.

19. The method of sealing a bag as recited in claim 18 where the step of sealing includes driving a first heat sealing bar member into interfacing relation with a second heat sealing bar member for capturing said bag therebetween.

20. The method of sealing a bag as recited in claim 19 where the step of driving said first heat sealing bar member is followed by the step of heat fusing opposing sidewalls of said bag.

21. the method of sealing a bag as recited in claim 20 where the step of heat fusing includes the step of applying a heat transfer gradient between said first and second heat sealing bar member.

22. The method of sealing a bag as recited in claim 15 where the step of securing said receipt to said bag includes the step of stapling said receipt to said bag.

23. The method of sealing a bag as recited in claim 22 where the step of stapling is followed by the step of cutting said receipt.

* * * * *